United States Patent

Kanai et al.

[11] Patent Number: 5,257,846
[45] Date of Patent: Nov. 2, 1993

[54] REVERSIBLE-LID ARRANGEMENT

[75] Inventors: Yoshifumi Kanai; Akira Kuwabara; Manabu Sakamoto, all of Kanagawa, Japan

[73] Assignee: Ikeda Bussan Co., Ltd., Ayase, Japan

[21] Appl. No.: 935,275

[22] Filed: Aug. 26, 1992

[30] Foreign Application Priority Data

Aug. 29, 1991 [JP] Japan .............................. 3-68749[U]

[51] Int. Cl.$^5$ ............................................. B62D 43/00
[52] U.S. Cl. .............................. 296/37.14; 296/37.16; 16/359; 16/361
[58] Field of Search .................... 296/37.2, 37.3, 37.1, 296/37.14, 37.16; 16/359, 361

[56] References Cited

U.S. PATENT DOCUMENTS

| | | | |
|---|---|---|---|
| 4,226,461 | 10/1980 | Ackel | 296/37.14 |
| 5,061,002 | 10/1991 | Saso | 296/37.3 |
| 5,080,417 | 1/1992 | Kanai | 296/37.3 |

FOREIGN PATENT DOCUMENTS 2248875 4/1992 United Kingdom ............. 296/37.14

Primary Examiner—Robert R. Song
Attorney, Agent, or Firm—Foley & Lardner

[57] ABSTRACT

A reversible-lid arrangement for a motor vehicle includes a floor panel having an opening, a lid member, and a pair of oppositely-arranged guide rails. The lid member is so sized as to close the opening, and has first and second side surfaces which are opposed to each other. The lid member has first and second projections which are formed on the first side surface and spaced away from each other with a certain predetermined distance therebetween, and third and fourth projections which are formed on the second side surface and spaced away from each other with the predetermined distance therebetween. The guide rails are so sized and spaced away from each other as to fit therein the first, second, third and fourth projections of the lid member. Each guide rail has first and second notches each of which is so sized as to allow one of the first, second, third and fourth projections to pass therethrough, and so positioned as to expose the one of the first, second, third and fourth projections when the opening of the floor panel is fully closed by the lid member. Thus, the lid member can be easily and quickly turned upside down without requiring much space.

8 Claims, 4 Drawing Sheets

REVERSIBLE-LID ARRANGEMENT

BACKGROUND OF THE INVENTION

1. Field of the Invention

The present invention relates in general to a reversible-lid arrangement, and more particularly to a reversible-lid arrangement for a vehicular luggage box which is formed below a floor panel of a vehicular luggage space.

2. Description of the Prior Art

In order to clarify the task of the present invention, one conventional reversible-lid arrangement for a vehicular luggage box will be outlined with reference to FIGS. 6 and 7 of the accompanying drawings.

As is seen from FIG. 6, designated by numeral 10 is a luggage space, for example, of a station wagon type motor vehicle for stowing bulky items therein. The luggage space 10 is located behind a rear seat 12 of the motor vehicle. A luggage box 14 is disposed below a floor panel 16 of the luggage space 10 so as to stow therein a spare tire and/or other items. A lid member 18 for the luggage box 14 is provided on the floor panel 16. As will be clarified hereinafter, when the lid member 18 is closed in a manner to expose its right side 18a which constitutes a part of the floor panel 16, as illustrated. That is, the right side 18a of the lid member 18 is kept horizontal and level with upper horizontal surfaces of the other parts of the floor panel 16. The other parts of the floor panel comprise a front portion 16a and two side portions 16b thereof.

The front portion 16a of the floor panel 16 is formed at its rear end with two spaced depressions 20. The lid member 18 is connected at its front end portion to the depressions 20 by means of two hinge members 22, thereby allowing the lid member 18 to pivotally move. Each hinge member 22 comprises a first movable part 22a and a second fixed part (not shown) which are respectively formed on the lid member 18 and on the depression 20. For the purpose which will be clarified hereinafter, each hinge member 22 has a known structure (not shown), such that the lid member 18 is detached from the front portion 16a of the floor panel 16 by raising the lid member 18 in a certain predetermined direction at its certain predetermined angular position relative to the front portion 16a of the floor panel 16.

The lid member 18 is made of plastic or the like, and has a carpet 24 which is fixedly secured on its right side 18a and a tray 26 which is provided on its reverse side 18b (see FIG. 7). In fact, the tray 26 is formed by providing a raised rectangular edge 28 for the purpose of stowing thereon small-sized items. With this, during a drive of the motor vehicle, these items do not scatter on the floor panel 16. On the other hand, the right side 18a of the lid member 18 is exposed so as to provide the floor panel 16 with a larger flat surface area, thereby stowing thereon bulky items. Thus, the lid member 18 is turned upside down according to its use.

The operation for turning the lid member 18 upside down will be described in the following paragraphs. The description will be commenced with respect to the lid member 18 which is fully closed and in engagement with the front portion 16a of the floor panel 16 with exposed its right side.

First, the lid member 18 is raised in a manner to detach the lid member 16 from the front portion 16a of the floor panel 16, i.e. to detach the first movable part 22a of the hinge member 22 from the second fixed part 22b thereof. Then, it is turned upside down by hand in the luggage space 10 or, if necessary, outside the motor vehicle. Then, the first movable part 22a of the hinge member 22 is brought into engagement again with the second fixed part 22b thereof. With this, the lid member 18 becomes pivotally movable relative to the front portion 16a of the floor panel 16, and, when the lid member 18 is fully closed, its reverse side 18b is exposed. However, this operation for turning the lid member 18 upside down is troublesome and time-consuming.

SUMMARY OF THE INVENTION

It is therefore an object of the present invention to provide a reversible-lid arrangement in which a lid member can be easily and quickly turned upside down.

According to the present invention, there is provided a reversible-lid arrangement for a motor vehicle; including: a floor panel having an opening; a lid member which is so sized as to close the opening, the lid member having first and second side surfaces which are opposed to each other, the lid member having first and second projections which are formed on the first side surface and spaced away from each other with a certain predetermined distance therebetween, the lid member having third and fourth projections which are formed on the second side surface and spaced away from each other with the predetermined distance therebetween; and a pair of oppositely-arranged guide rails for guiding a sliding movement of the lid member, the guide rails being so sized and spaced away from each other as to fit therein the first, second, third and fourth projections of the lid member, each guide rail having first and second notches each of which is so sized as to allow one of the first, second, third and fourth projections to pass therethrough, and so positioned as to expose the one of the first, second, third and fourth projections when the opening of the floor panel is fully closed by the lid member.

DESCRIPTION OF THE PREFERRED INVENTION

Referring to FIGS. 1 to 5, there is shown a reversible-lid arrangement for a vehicular luggage box, in accordance with the present invention.

A detailed explanation of parts substantially the same as those of the above-mentioned conventional reversible-lid arrangement will be omitted from the following description.

Figure 1:
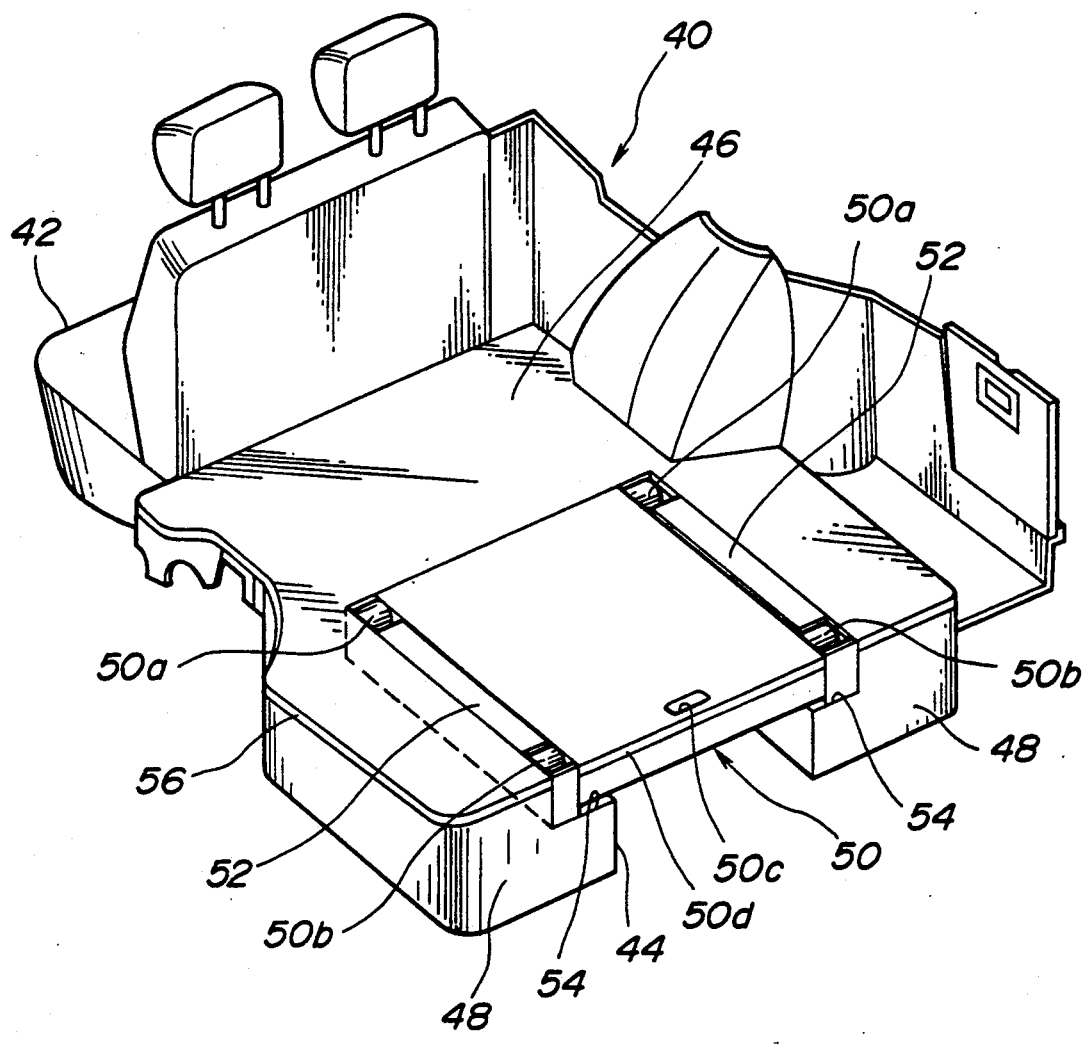
FIG. 1 is a perspective, but partially cutaway, view of a rear body, for example, of a station wagon type motor vehicle, showing a reversible-lid arrangement for a luggage box in accordance with the present invention.

As is seen from FIG. 1, there is provided a luggage space 40 which is located behind a rear seat 42, for example, of a station wagon type motor vehicle. A luggage box 44 is formed below a floor panel 46 of the luggage space 40. There are provided two side boxes 48 which are separated from and disposed beside the luggage box 44. Each side box 48 has a lid member to open or close the same. However, if desired, the luggage box 44 and the side boxes 48 may be united so as to form a united one space therein.

Figure 2:
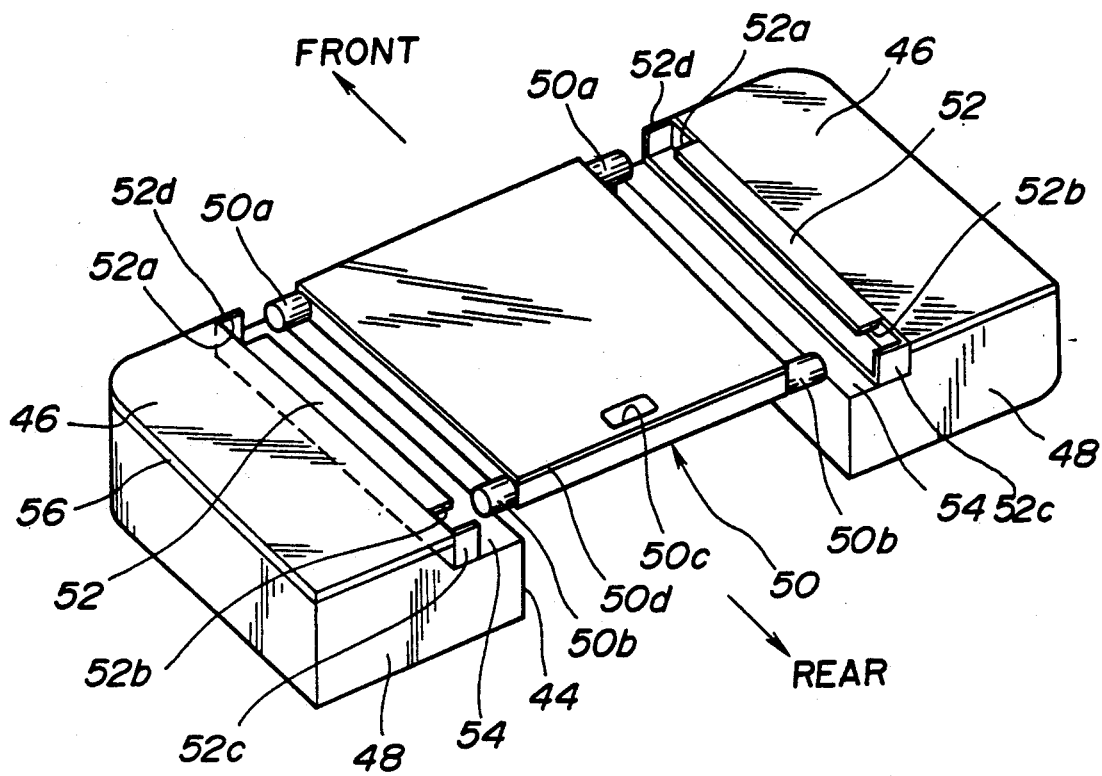
FIG. 2 is a partially exploded and perspective view of the reversible-lid arrangement.

As shown in FIG. 2, a lid member 50 for the luggage box 44 which is made of plastic or the like has two front cylindrical projections 50a and two rear cylindrical projections 50b which are respectively formed on front and rear end portions of side surfaces of the lid member 50. The lid member 50 is further formed with a rectangular opening 50c for gripping the same. The lid member 50 has a carpet 50d which is fixedly secured to the right side of the lid member 50 and a tray 50e (see FIG. 3) which is formed on the reverse side of the same.

Two oppositely-arranged guide rails 52 are respectively fixedly secured on outward portions of depressed surfaces 54 which are respectively formed on the side boxes 48.

As is seen from FIG. 1, when the lid member 50 is fully closed, side edge portions of either one of the right and reverse sides of the lid member 50 are placed on inward portions of the depressed surfaces 54 of the side boxes 48.

As is seen from FIG. 2, each guide rail 52 is boxlike in shape, and defines therein a rectangular space which is so sized as to allow the cylindrical projections 50a and 50b of the lid member 50 to slide therein. Each guide rail 52 has front and rear notches 52a and 52b which are formed on longitudinally opposed end portions of an upper horizontal wall portion thereof. Each notch 52a or 52b is so sized as to allow the cylindrical projection 50a or 50b of the lid member 50 to pass therethrough. The notches 52a and 52b of each guide rail 52 are spaced from each other with a same certain predetermined distance therebetween. This distance is substantially the same as that which is defined between the cylindrical projections 50a and 50b which are formed on each side surface of the lid member 50. Thus, when the lid member 50 is kept horizontal, it can be brought into engagement with the guide rails 52 by passing the cylindrical projections 50a and 50b through the notches 52a and 52b in a vertical direction from the above.

As is seen from FIG. 1, under a normal condition, the lid member 50 is kept horizontal so as to close the luggage box 44, and the right side of the lid member 50 is exposed. With this, the lid member 50 constitutes a part of the floor panel 46. That is, a carpeted surface of the right side of the lid member 50 is kept level with the other part of the floor panel 46 which is also furnished with a carpet 56.

When the lid member 50 is fully closed, all the cylindrical projections 50a and 50b of the lid member 50 are received in the guide rails 52 and exposed through the notches 52a and 52b.

The operation for turning the lid member 50 upside down will be described in the following paragraphs. The description will be commenced with respect to the lid member 50 which is in the above-mentioned normal condition.

Figure 3:
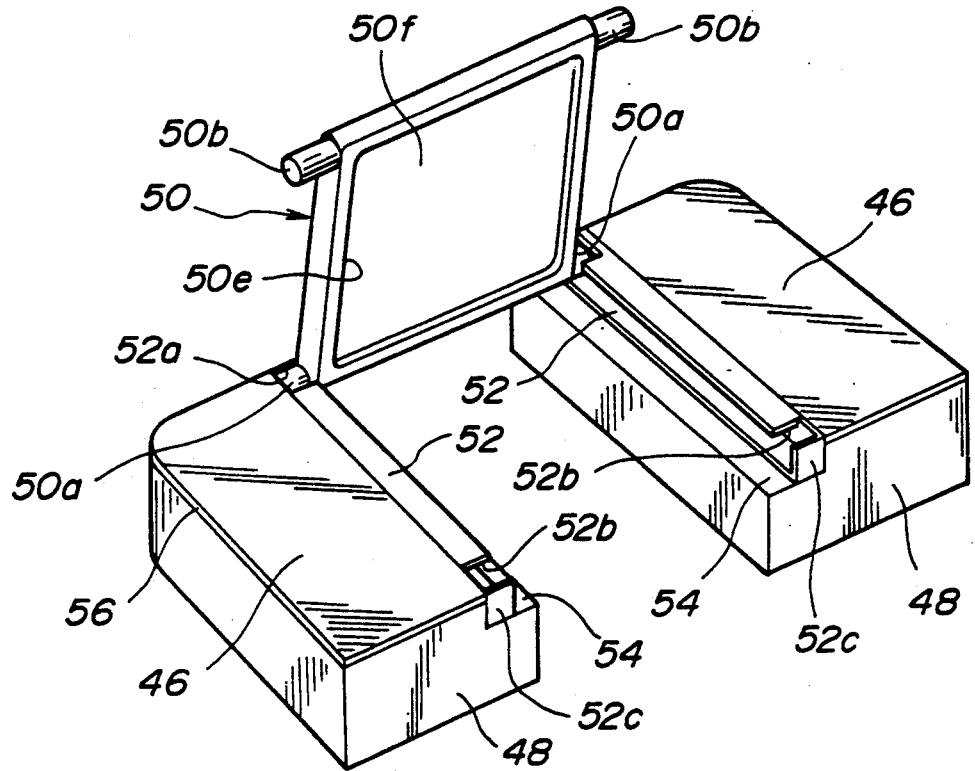
FIG. 3 is a perspective view of the reversible-lid arrangement, showing a condition in which a lid member is opened by swinging the same about a common axis of front cylindrical projections thereof.
Figure 4:
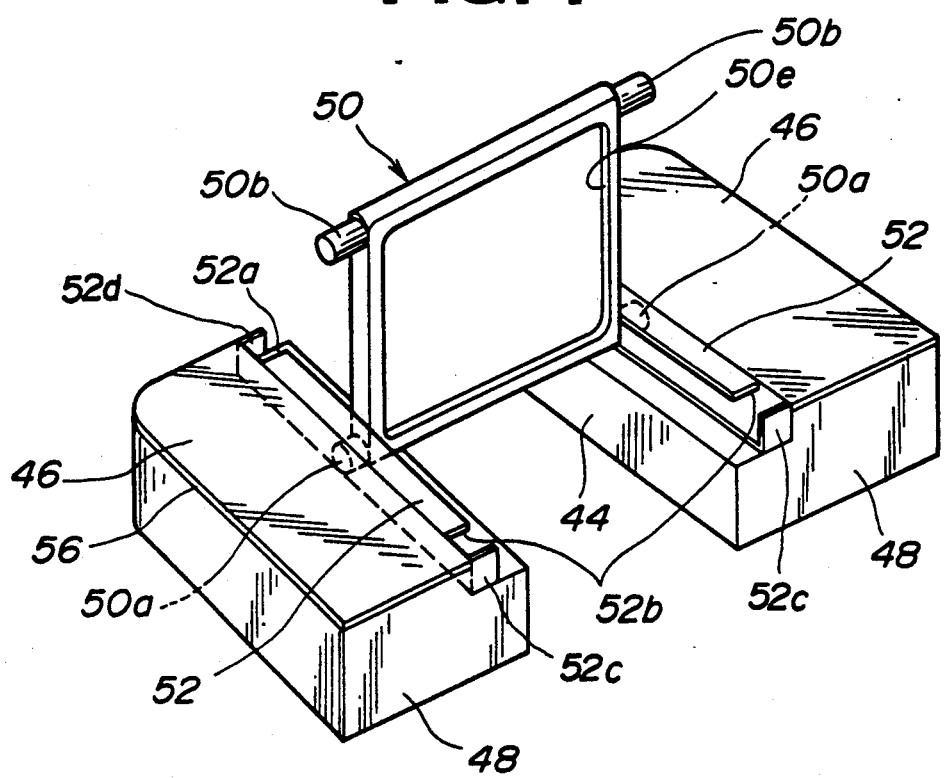
FIG. 4 is a view similar to FIG. 3, but showing a condition in which the lid member is rearwardly slidingly moved to a midpoint of guide rails.

First, as is seen from FIG. 3, the lid member 50 is upwardly swung about a common axis of the front cylindrical projections 50a of the lid member 50. With this, the rear cylindrical projections 50b of the lid member 50 passes through the rear notches 52b of the guide rails 52. Then, as is seen from FIG. 4, the lid member 50 is rearwardly moved by sliding the front cylindrical projections 50a of the lid member 50 in the rectangular space defined by the guide rails 52.

Figure 5:
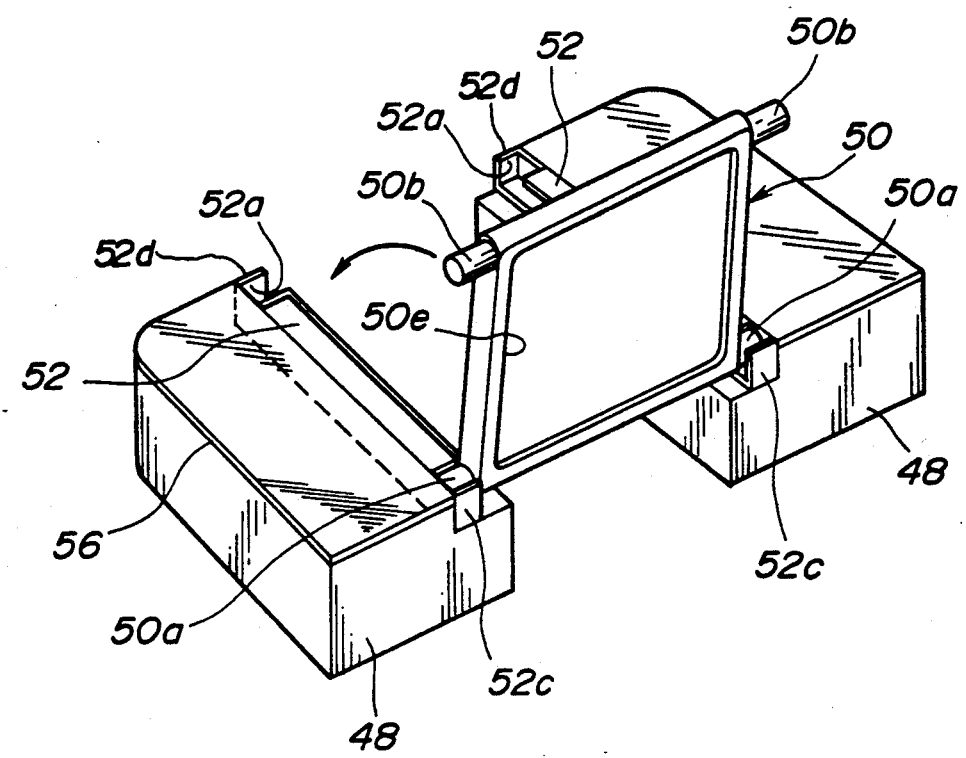
FIG. 5 is a view similar to FIG. 3, but showing a condition in which the lid member is rearwardly slidingly moved to a rearend point of the guide rails.
Figure 6:
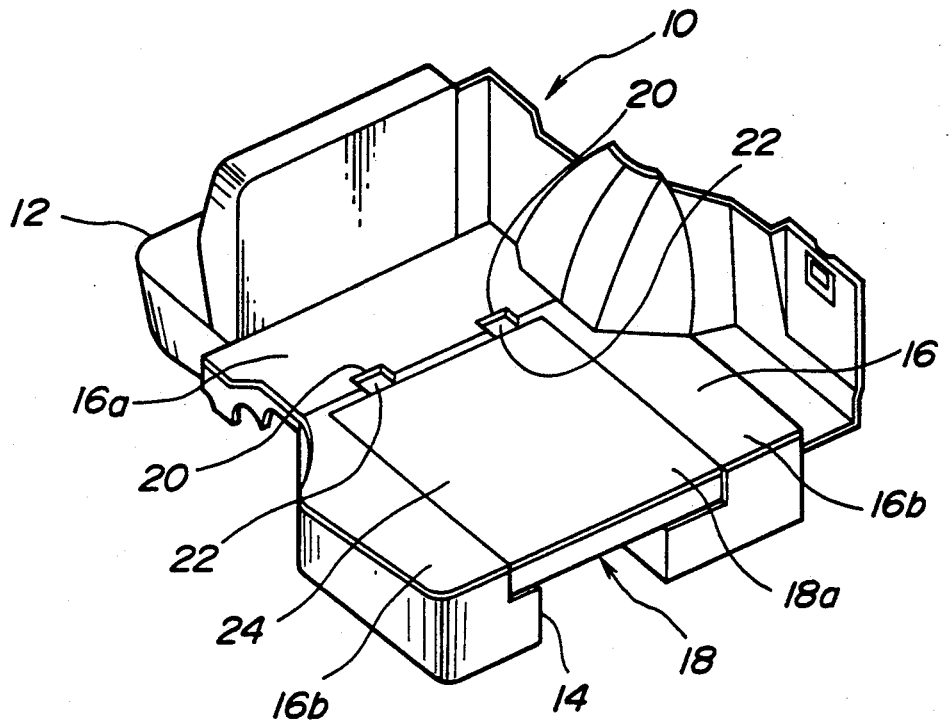
FIG. 6 is a view similar to FIG. 1, but showing a conventional reversible-lid arrangement.
Figure 7:
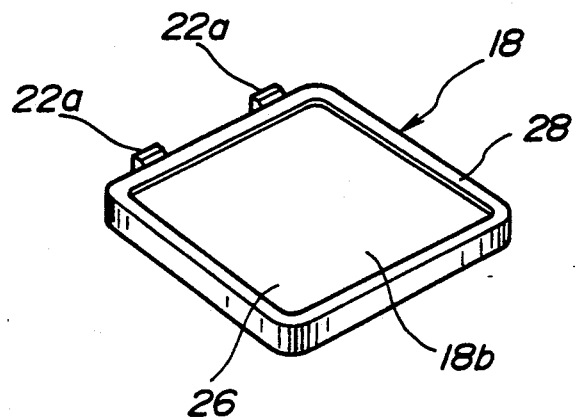
FIG. 7 is a perspective view of a conventional lid member with exposing its reverse side.

As is seen from FIG. 5, the lid member 50 is rearwardly moved until the front cylindrical projections 50a are bought into abutment with rear end vertical wall portions 52c of the guide rails 52. Then, the lid member 50 is forwardly laid so as to fully close the luggage box 44. With this, the rear cylindrical projections 50b of the lid member 50 pass through the front notches 52a of the guide rails 52, and then all the cylindrical projections 50a and 50b of the lid member 50 are received in the guide rails 52. Thus, the reverse side 50f of the lid member 50 is exposed.

It should be noted that, when the lid member 50 is fully closed, each cylindrical projection 50a or 50b of the lid member 50 is in abutment with an elongate side wall portion (no numeral) and one of the rear end vertical wall portion 52c and a front end vertical wall portion 52d. With this, when the lid member 50 is fully closed, it does not have play relative to the guide rails 52.

As compared with the conventional reversible-lid arrangement, the lid member 50 according to the present invention can be easily and quickly turned upside down without requiring much space.

What is claimed is:

1. A reversible-lid arrangement for a motor vehicle, comprising:
    a floor panel having an opening;
    a lid member which is so sized as to close said opening, said lid member having first and second side surfaces which are opposed to each other, said lid member having first and second projections which are formed on the first side surface and spaced away from each other by a predetermined distance, said lid member having third and fourth projections which are formed on the second side surface and spaced away from each other by said predetermined distance; and
    a pair of oppositely-arranged guide rails for guiding a sliding movement of said lid member, said guide rails being mounted along opposing sides of said opening of said floor panel, said guide rails being sized and spaced away from each other so as to fit therein said first, second, third and fourth projections of said lid member, each guide rails having first and second notches each of which is sized so as to allow one of said first, second, third and fourth projections to pass therethrough, and which is positioned so as to expose said one of said first, second, third and fourth projections when said opening of said floor panel is fully closed by said lid member.

2. A reversible-lid arrangement as claimed in claim 1, wherein said first, second, third and fourth projections are cylindrical in shape.

3. A reversible-lid arrangement as claimed in claim 1, wherein each guide rail is rectangular and boxlike in shape, and has upper and lower horizontal wall portions which are opposed to each other and first and second vertical wall portions which are opposed to each other, and wherein said first and second notches are formed through the upper wall portion.

4. A reversible-lid arrangement as claimed in claim 3, wherein said first and second notches are formed through longitudinally opposed end portions of the upper horizontal wall portion, and wherein said first and second projections and said third and fourth projections of said lid member are respectively formed on longitudinally opposed end portions of said first and second side surfaces.

5. A reversible-lid arrangement as claimed in claim 3, wherein said upper and lower horizontal wall portions of each guide rail are spaced away so as to allow said first, second, third and fourth projections to smoothly slide therebetween.

6. A reversible-lid arrangement as claimed in claim 1, wherein said first and third projections of said lid member are aligned with each other and have first common axis, and wherein said second and fourth projections of said lid member are aligned with each other and have a second common axis.

7. A reversible-lid arrangement as claimed in claim 6, wherein said guide rails are arranged so as to allow said lid member to pivot about the first common axis when said first and third projections are received in said guide rails and to pivot about the second common axis when said second and fourth projections are received in said guide rails.

8. A reversible-lid arrangement as claimed in claim 1, further comprising a luggage box which is disposed below said opening of said floor panel, and first and second side boxes interposing therebetween said luggage box, said first and second side boxes having horizontal surfaces on which side end portions of said lid member are supported.

* * * * *